United States Patent
Gow et al.

(10) Patent No.: US 10,664,365 B2
(45) Date of Patent: May 26, 2020

(54) SYSTEM AND METHOD FOR MONITORING AND CONTROLLING A BACK-UP POWER SUPPLY USING TEMPERATURE CONTROLLED BATTERIES

(71) Applicant: Google LLC, Mountain View, CA (US)

(72) Inventors: Philippe Gow, Sunnyvale, CA (US); Christina Peabody, Fremont, CA (US)

(73) Assignee: Google LLC, Mountain View, CA (US)

( * ) Notice: Subject to any disclaimer, the term of this patent is extended or adjusted under 35 U.S.C. 154(b) by 183 days.

(21) Appl. No.: 15/923,802

(22) Filed: Mar. 16, 2018

(65) Prior Publication Data
US 2019/0058352 A1 Feb. 21, 2019

Related U.S. Application Data

(60) Provisional application No. 62/548,191, filed on Aug. 21, 2017.

(51) Int. Cl.
*G06F 11/20* (2006.01)
*H02J 9/06* (2006.01)
(Continued)

(52) U.S. Cl.
CPC ......... *G06F 11/2015* (2013.01); *G06F 1/263* (2013.01); *G06F 1/30* (2013.01);
(Continued)

(58) Field of Classification Search
CPC ......... H02J 9/061; H02J 7/0013; G06F 1/263; G06F 1/30; G06F 11/2015;
(Continued)

(56) References Cited

U.S. PATENT DOCUMENTS 4,675,538 A 6/1987 Epstein
5,422,558 A 6/1995 Stewart
(Continued)

FOREIGN PATENT DOCUMENTS

EP 2706647 A2 3/2014
WO 2012124490 A1 9/2012

OTHER PUBLICATIONS

Battery and Energy Technologies. Woodbank Communications Ltd. 2005 (retrieved on Nov. 7, 2019). Retrieved from the Internet <URL: https://www.mpoweruk.com/storage.htm>.*

(Continued)

*Primary Examiner* — Paul Contino
(74) *Attorney, Agent, or Firm* — Lerner, David, Littenberg, Krumholz & Mentlik, LLP

(57) ABSTRACT

Systems and methods of monitoring and controlling a back-up power supply are provided. The back-up power supply can include an uninterruptible power supply system configured with a plurality of primary battery banks maintained in long-term storage and a working battery maintained in an operable state. The back-up power supply system can monitor the condition of a first working battery to determine if the condition is below a performance threshold or a capacity threshold. The uninterruptible power supply system can transition a primary battery bank previously maintained in long-term storage to an operable state and designate the transitioned primary battery as a second working battery. The uninterruptible power supply system can switch the source of power provided by the back-up power supply from the first working battery to the second working battery.

32 Claims, 9 Drawing Sheets

(51) Int. Cl.
- *G06F 1/30* (2006.01)
- *G06F 1/26* (2006.01)
- *G06F 11/30* (2006.01)
- *H01M 10/48* (2006.01)
- *H01M 10/42* (2006.01)
- *H01M 10/44* (2006.01)
- *H02J 7/00* (2006.01)
- *H01M 10/617* (2014.01)
- *H01M 6/50* (2006.01)
- *H01M 10/627* (2014.01)
- *H01M 10/6561* (2014.01)
- *H01M 16/00* (2006.01)

(52) U.S. Cl.
CPC ...... *G06F 11/3058* (2013.01); *G06F 11/3062* (2013.01); *H01M 10/4207* (2013.01); *H01M 10/441* (2013.01); *H01M 10/482* (2013.01); *H02J 7/0013* (2013.01); *H02J 9/061* (2013.01); *H01M 6/5038* (2013.01); *H01M 10/617* (2015.04); *H01M 10/627* (2015.04); *H01M 10/6561* (2015.04); *H01M 16/00* (2013.01); *H02J 7/0024* (2013.01); *H02J 2007/0067* (2013.01)

(58) Field of Classification Search
CPC ............ G06F 11/3058; G06F 11/3062; H01M 10/482; H01M 10/4207; H01M 10/441
See application file for complete search history.

(56) References Cited

U.S. PATENT DOCUMENTS

| | | | |
|---|---|---|---|
| 6,436,583 B1 | 8/2002 | Mikhaylik | |
| 9,225,190 B2 | 12/2015 | Labbe et al. | |
| 2004/0257089 A1* | 12/2004 | Aridome | H01M 10/486 324/430 |
| 2007/0145949 A1* | 6/2007 | Matsushima | H02J 7/00 320/132 |
| 2008/0096095 A1 | 4/2008 | Dekel | |
| 2014/0062203 A1* | 3/2014 | Hirata | H02J 9/061 307/66 |
| 2014/0227568 A1* | 8/2014 | Hermann | H01M 10/633 429/62 |
| 2017/0229878 A1* | 8/2017 | Kim | H02J 7/007 |
| 2017/0284709 A1* | 10/2017 | Hirsch | F25B 21/04 |

OTHER PUBLICATIONS

Written Opinion of the International Preliminary Examining Authority for International Application No. PCT/U2018/037298 dated Jul. 10, 2019. 7 pages.

International Search Report and Written Opinion dated Sep. 26, 2018 in International (PCT) Application No. PCT/US2018/037298.

Office Action for Taiwanese Patent Application No. 107121515 dated Aug. 6, 2019.

International Preliminary Report on Patentability for International Application No. PCT/US2018/037298 dated Nov. 5, 2019. 23 pages.

* cited by examiner

SYSTEM AND METHOD FOR MONITORING AND CONTROLLING A BACK-UP POWER SUPPLY USING TEMPERATURE CONTROLLED BATTERIES

RELATED APPLICATIONS

The present application claims priority to and the benefit of U.S. Provisional Application No. 62/548,191 filed on Aug. 21, 2017 and titled "SYSTEM AND METHOD FOR MONITORING AND CONTROLLING A BACK-UP POWER SUPPLY USING TEMPERATURE CONTROLLED BATTERIES," which is herein incorporated by reference in its entirety for all purposes.

BACKGROUND

A back-up power supply is frequently used to provide back-up power to a load in the event of a power outage or a disruption in a power supply. Back-up power supply systems typically include one or more batteries which are sufficiently sized to provide enough power to the power load for a short duration of time until the primary power source can be restored or power conditions have improved.

SUMMARY

According to one aspect, the disclosure relates to an uninterruptible power supply system. The uninterruptible power supply system includes a back-up power supply which further includes a plurality of primary battery banks arranged in parallel. The plurality of primary battery banks include at least one of the primary battery banks maintained in a long-term storage state and one of primary battery banks maintained in an operable state and designated as a first working battery. The uninterruptible power supply system further includes a plurality of battery condition sensors. The battery condition sensors measure the condition of a corresponding primary battery bank of the plurality of primary battery banks. The uninterruptible power supply system further includes a back-up power supply controller including one or more processors configured to monitor the condition of the first working battery. The back-up power supply controller is further configured to determine if the condition of the first working battery is below a transition preparation threshold. Responsive to a determination that the first working battery is below the transition preparation threshold, the back-up power supply controller is further configured to transition one of the primary battery banks previously maintained in the long-term storage state to the operable state. The back-up power supply controller is further configured to designate the transitioned primary battery bank as a second working battery, and switch the source of the power provided by the back-up power supply from the first working battery to the second working battery.

In some implementations, the condition of each primary battery bank in the plurality of primary battery banks is determined based on measurements of at least one of voltage, resistance, temperature, or the output current of the respective primary battery bank.

In some implementations, back-up power supply controller is further configured to determine if the condition of the first working battery is below an intermediate threshold. In some implementations, the intermediate threshold includes one of an output voltage threshold, a shelf-life threshold or an operating time threshold. In some implementations, responsive to determining that the condition of the working battery is below an intermediate threshold, where the intermediate threshold is higher than the transition preparation threshold, the uninterruptible power supply system is further configured to transition one of the primary battery banks previously maintained in a long-term state to an intermediate state. In some implementations, switching the source of power provided by the back-up power supply is further based on the determination that the condition of the first working battery is below a retirement threshold. In some implementations, the transition preparation threshold and the retirement threshold include one of a performance threshold or a capacity threshold. In some implementations, the performance threshold includes an output voltage threshold and in some implementations, the capacity threshold includes a shelf-life threshold or an operating time threshold.

In some implementations, the uninterruptible power supply system further includes a temperature control system to maintain at least one of the plurality of primary battery banks in a long-term storage state and to maintain one of the primary battery banks in an operable state, where the long-term storage state includes a refrigerated state and the operative state includes a state in which the temperature is higher than the refrigerated state. In some implementations, the temperature control system includes a thermal coupling to a load to which the back-up power supply provides power to. In some implementations, the plurality of primary battery banks maintained in a long-term storage state are refrigerated to between −5-10 degrees Celsius.

In some implementations, the uninterruptible power supply system further includes a power supply control system. The power supply control system is configured to monitor an external power supply providing a power load. The power supply control system is further configured to detect a power disruption in the power supplied by the external power supply. Responsive to detecting a power disruption in the power supplied by the external power supply, the power supply control system is further configured to control a first switch to change the supply of power to the load from the external power supply to the back-up power supply. In some implementations, the load includes a plurality of interconnected computing devices.

In some implementations, the power supply control system is further configured to include a capacitor or a rechargeable battery to provide power to the load while the power supply control system switches to provision of power from the back-up power supply.

In some implementations, transitioning one of the primary battery banks previously maintained in the long-term storage state to the operable state includes introducing an electrolyte into the batteries of the transitioned battery bank. In some implementations, transitioning one of the primary battery banks previously maintained in the long-term state to the operable state includes warming the primary battery bank.

According to another aspect, the disclosure relates to a method. The method includes monitoring, by a back-up power supply controller, the condition of a first working battery. The method further includes determining, by the back-up power supply controller, if the condition of the first working battery is below a transition preparation threshold. The method further includes, responsive to the determination that the first working battery is below the transition preparation threshold, transitioning, by the back-up power supply controller, at least one of the primary battery banks in a plurality of primary battery banks previously maintained in a long-term storage state to an operable state. The method further includes designating the transitioned primary battery bank as a second working battery, and switching the source of the power provided by the back-up power supply from the first working battery to the second working battery. In some implementations, the method further includes monitoring, by a power supply control system, an external power supply providing a power load. The method further includes detecting a power disruption in the power supplied by the external power supply. Responsive to detecting a power disruption in the power supplied by the external power supply, the method includes controlling, a first switch to change the supply of power to the load from the external power supply to the back-up power supply. In some implementations, the load includes a plurality of interconnected computing devices.

In some implementations, the method includes determining the condition of each primary battery bank in the plurality of primary battery banks based on measurements of at least one of voltage, resistance, temperature, or the output current of the respective primary battery bank.

In some implementations, the method includes determining if the condition of the first working battery is below an intermediate threshold. In some implementations, the intermediate threshold includes one of an output current threshold, a shelf-life threshold or an operating time threshold. In some implementations, the method includes determining if the condition of the first working battery is below a retirement threshold. In some implementations, the transition preparation threshold and the retirement threshold include one of a performance threshold or a capacity threshold. In some implementations, the performance threshold includes an output voltage threshold and in some implementations, the capacity threshold includes a shelf-life threshold or an operating time threshold. In some implementations, the method includes determining that the condition of the working battery is below an intermediate threshold, where the intermediate threshold is higher than the transition preparation threshold, and responsive to a determination that the condition of the first working battery is below an intermediate threshold, transitioning one of the primary battery banks previously maintained in a long-term state to an intermediate state.

In some implementations, the method includes maintaining, by a temperature control system, at least one of the plurality of primary battery banks in a long-term storage state and maintaining one of the primary battery banks in an operable state, where the long-term storage state includes a refrigerated state and the operative state includes a state in which the temperature is higher than the refrigerated state. In some implementations, transitioning one of the primary battery banks previously maintained in a long-term storage state to an operable state utilizing a temperature control system includes directing heat from the temperature control system to a load to which the back-up power supply provides power to. In some implementations, the method includes maintaining the plurality of primary battery banks in a long-term storage state by refrigerating the plurality of primary battery banks to between −5 and 10 degrees Celsius.

In some implementations, the method includes providing power to the load power by way of a capacitor or a rechargeable battery while the power supply control system switches to provision of power from the back-up power supply.

In some implementations, the method includes transitioning one of the primary battery banks previously maintained in the long-term storage state to the operable state by introducing an electrolyte into the batteries of the transitioned battery bank. In some implementations, the method includes transitioning one of the primary battery banks previously maintained in the long-term state to the operable state by warming the primary battery bank.

BRIEF DESCRIPTION OF THE DRAWINGS

The above and related objects, features, and advantages of the present disclosure will be more fully understood by reference to the following detailed description, when taken in conjunction with the following figures, wherein.

DETAILED DESCRIPTION

Figure 1A:
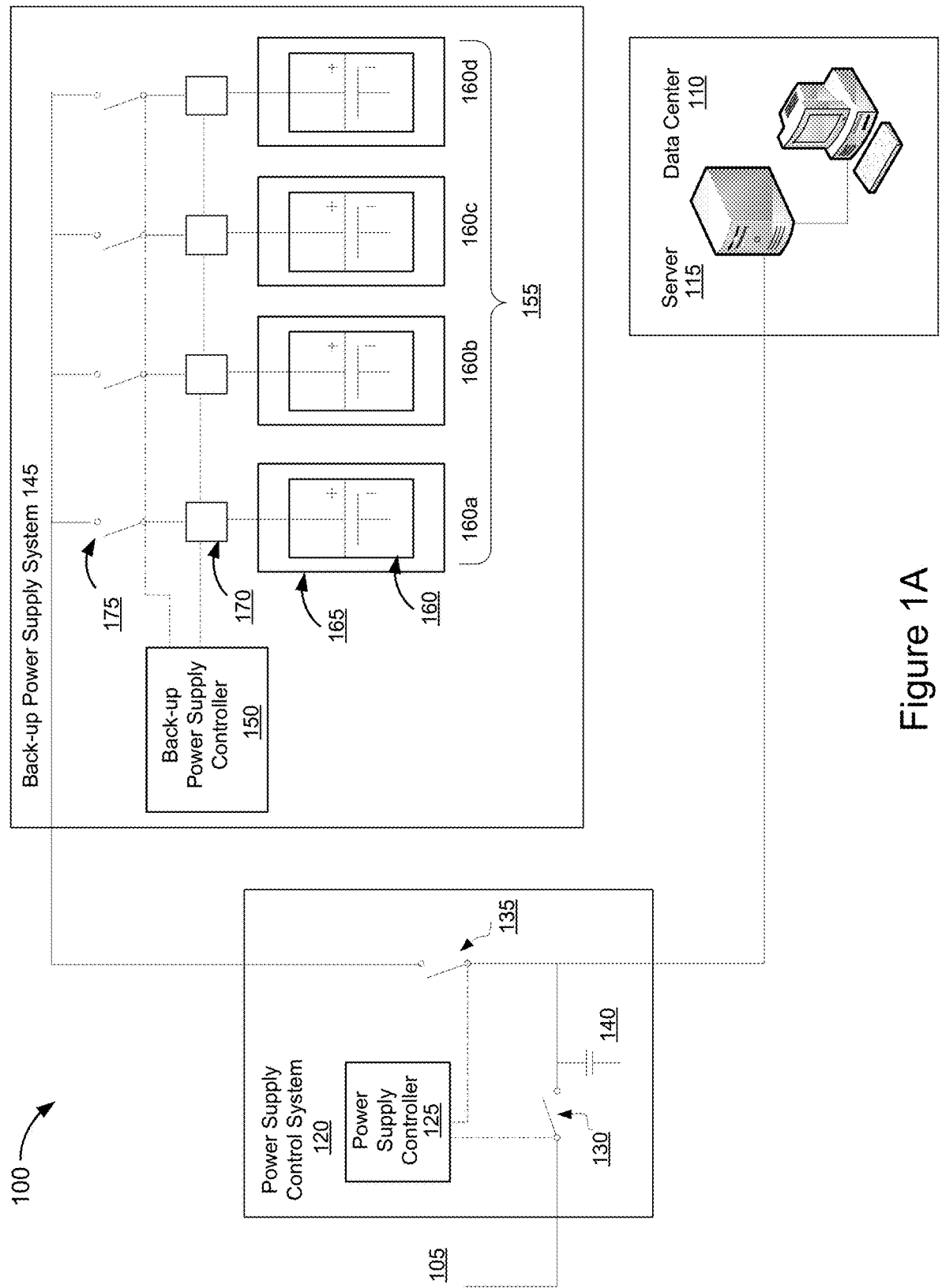
FIGS. 1A and 1B are block diagrams of example architectures for an uninterruptible power supply system and a power supply control system.

Back-up power supply systems are often utilized to provide a source of back-up power to a power load in the event of power outages or disruptions in the power supply. Back-up power supply systems may be designed in a number of different configurations using rechargeable batteries, diesel-powered generators or hybrid battery-generator systems. "Primary," i.e., non-rechargeable, batteries have typically not been used in back-up power supply systems due to poor economics per kilowatt hour (kWh) delivered over multiple cycles as compared to rechargeable batteries. However, when considering infrequent power outages or power disruptions, back-up power supply systems including primary batteries or banks of primary batteries may be more economical, especially when further considering that primary battery material costs are often significantly less than rechargeable battery material costs. Storing primary batteries at lower temperatures (e.g. −5 degrees Celsius to 10 degrees Celsius) can prolong battery shelf-life and reduce capacity loss due to self-discharge. Accordingly, maintaining a system of primary battery banks in a long-term storage state, such as batteries stored at lower temperatures, may further improve the economics and viability of this configuration for a back-up power supply.

Presented are systems and methods related to monitoring and controlling an uninterruptible power supply system using a back-up power supply system that may be configured with a plurality of primary battery banks. The plurality of primary battery banks in the back-up power supply system may include primary battery banks in a long-term storage state and primary battery banks in an operable state. For example, the primary battery banks in a long-term storage state may include primary battery banks that are maintained in storage for future use and are not fully functional to provide a source of back-up power. Primary battery banks in an operable state include primary battery banks that are not being maintained or stored in a long-term storage state and are functioning as an operable source of back-up power to a power load.

The states of a given primary battery bank may be based on environmental conditions, as well as the presence (or absence) of specific battery bank components. In some implementations, the primary battery banks maintained in a long-term storage state are maintained in the state based on controlling the temperature of the primary battery banks. For example, the plurality of primary battery banks maintained in a long-term storage state may be maintained in a refrigerated state at a temperature between about −5 degrees Celsius to about 10 degrees Celsius. In other implementations, the long-term storage state can be achieved by other methods known in the art to prolong the shelf-life of primary battery banks. In some implementations, the plurality of battery banks may be maintained in a long-term storage state by storing the primary battery banks without the presence of battery electrolyte in the cells of each primary battery included in the primary battery bank.

Primary battery banks in an operable state may include primary battery banks at a temperature that is higher than the refrigerated state. A primary battery bank in an operable state may be designated as a first working battery. For example, the first working battery may be a primary battery bank that is maintained at a non-refrigerated state to enable the working battery to more efficiently discharge its operable capacity to the power load. In some implementations, the primary battery bank in an operable state may include the presence of battery electrolyte in the cells of each primary battery included in the primary battery bank, thereby enabling the primary battery bank to discharge its current and provide a source of back-up power as an operational primary battery bank in the back-up power supply system.

The back-up power supply system may also include multiple battery condition sensors. For example, each battery condition sensor may measure the condition of the primary battery bank to which it is connected and transmit measurements of voltage, average voltage, resistance, temperature, or output current to the uninterruptible power supply system.

The back-up power supply system may also include a back-up power supply controller configured with one or more processors. For example, the processors may be configured to monitor the condition of the first working battery based on the output of one of the battery condition sensors. In addition, the back-up power supply controller may be further configured to determine if the condition of the first working battery is below a transition preparation threshold or retirement threshold. In some implementations, a transition preparation threshold may include a threshold identifying the output current or voltage of the first working battery. In some implementations, a retirement threshold may include a threshold identifying a shelf-life threshold or an operating time threshold. Responsive to determining that the first working battery is below a transition preparation threshold, the back-up power supply controller is further configured to transition one of the primary battery banks previously maintained in a long-term storage state to the operable state. For example, the back-up power supply controller may transition the primary battery bank to an operable state by heating the primary battery to an operable temperature. In some implementations, one of the primary battery banks may be transitioned to an operable state by means other than temperature control, such as by adding battery electrolyte to bring the batteries in the bank to an operable state. Additionally, the back-up power supply controller may be configured to designate a transitioned primary battery as a second working battery and switch the source of power provided by the back-up power supply from the first working battery to the second working battery based on determining that the condition of the first working battery has deteriorated to a non-operational or near non-operational state.

In some implementations, the back-up power supply system may further include a temperature control system to provide cooling to maintain primary battery banks in a long-term storage state and to provide heating to transition the primary battery banks from the refrigerated, long-term storage state to a non-refrigerated, operable state. The temperature control system may be thermally coupled to the load to which the back-up power supply system provides power to. In some implementations, the temperature control system can be configured to maintain the temperature of a working battery bank within a range determined to be optimal for power provision.

In some implementations, the uninterruptible power supply system may further include a power supply control system. For example, the power supply control system may include a processor configured to monitor an external power supply providing power to a load. For example, the power supply control system may monitor an external power supply from a local power provider providing power to a computer data center, a network operations center, a telecommunications system core, or any other plurality of interconnected computing devices. In other implementations, the load can be any other load desiring a high reliability, economical, long-term uninterruptible power supply. The power supply control system may be configured to further detect a power disruption in the power supplied by the external power supply. In addition, responsive to detecting the power disruption, the power supply control system may control a switch to change the supply of power to the power load from the external power supply to the back-up power supply. In some implementations, the power supply control system may include a capacitor or a rechargeable battery to provide power to the load while the power supply control system switches to provide power from the back-up power supply.

FIG. 1A is a block diagram of an example architecture 100 for an uninterruptible power supply system 100. In broad overview, the uninterruptible power supply system 100 includes a power supply control system 120 and a back-up power supply system 145. For exemplary purposes, the illustrated uninterruptible power supply system 100 is shown connected to a power supply 105 providing power to a data center 110. The data center 110 may include one or more servers 115. The data center servers 115 may be configured to store, process, and transmit data continuously and may require an uninterruptible power supply system to provide users or customers with reliable quality of service in the event of a power outage or other power disruption. In some implementations, the power supply 105 may provide power to a portion of a data center. For example, the critical components of the data center, such as servers designated as running higher priority services or applications may receive power from power supply 105 while an alternate power supply 105 provides power to other less critical parts of the data center. Power supply 105 may include AC (alternating current) power provided by a local (e.g., an on-site wind, solar, geothermal, or fossil fuel based power source, or a municipal, regional or national energy supplier operating one or more power generation stations and which delivers power to residences and businesses over a network of transmission lines.

As shown in FIG. 1A, a power supply control system 120 may monitor and control connections to the power supply 105 supplying power to the data center 110. The power supply control system 120 includes a power supply controller 125, power supply switch 130, back-up power supply switch 135, and a capacitor 140. The power supply control system 120 includes power lines, shown as solid lines, conveying power directly or indirectly to other components. In addition, the power supply control system 120 includes control lines, shown as dashed lines, conveying control data or signals to switches and/or other components. The control lines can be electrical cables carrying analog or digital control signals, or electrical or optical communications lines carrying packetized control instructions. The power supply control system 120 operates to detect power inconsistencies and/or power outages associated with a power supply, such as power supply 105. Based on detecting fluctuations in the power supply, for example a power surge, a power reduction, a power outage or other inconsistent power conditions associated with the power supply 105, the power supply control system 120 is configured to control a plurality of switches to provision power from a more consistent and reliable power source.

As further shown in FIG. 1A, the power supply control system 120 includes a power supply controller 125. As used herein, a "controller" is a device or collection of devices that serve to govern the performance of a device or collection of other devices in a predetermined manner. A controller includes one or more processors, such as application specific integrated circuits (ASICs), field programmable gate arrays (FPGAs), or microprocessors, configured to receive an electrical input signal from sensors or devices associated with a process being measured, compare the input signal values with predetermined control point values or other programmable logic configured on the processors in order to determine and generate the appropriate output signal to the devices controlling the process being measured. Further discussion of example suitable controller architectures is set for below in relation to FIG. 6. The power supply controller 125 includes one or more processors configured to monitor the condition or quality of the power supplied by power supply 105. For example, the power supply controller 125 may be configured with or coupled to sensors and/or sensing functionality to monitor the power supply 105 and detect fluctuations in voltage, frequency, and waveform. Inconsistencies in these power supply characteristics may be detected by the power supply controller 125 and cause the one or more processors to control switches to disconnect the power supply 105 providing the inconsistent power or that is experiencing a power outage from the data center 110.

Referring again to FIG. 1A, the power supply control system 120 includes one or more switches to control the provision of the power supply 105 to a power load, for example the data center 110. In other implementations, the power load can be a commercial building, a network operations center or any electricity consuming device or collection of devices. The switches in the power supply control system 120 include a power supply switch 130 and a back-up power supply switch 135. The power supply switch 130 and the back-up power supply switch 135 may include, but are not limited to electromagnetic relays, electromechanical relays, or switches suitable for controlling transmission of power through high-power lines. The switches may be opened or closed by the power supply controller 125 via control lines, as shown in FIG. 1 with dashed lines. The power supply switch 130 is controlled by the power supply controller 125 and operates to enable the transmission of power from a primary power supply, such as the power supply 105. The power supply switch 130 may be controlled by the power supply controller 125 to open the power supply switch 130 and thereby, discontinue the transmission of power provided by the power supply 105 in the event that the power supply controller 125 has detected poor power quality conditions or a power outage. Upon detecting improvements in the quality of power conditions or the restoration of the power supplied by the power supply 105, the power supply controller 125 may close the power supply switch 130 and thereby enable the transmission of power provided by the power supply 105.

As further shown in FIG. 1A, the power supply control system includes a back-up power supply switch 135. The back-up power supply switch is also controlled by the power supply controller 125 and operates to enable the transmission of power from a back-up power supply. The back-up power supply switch may be controlled by the power supply controller 125 to close the back-up power supply switch 135 when a power disruption, power outage or inconsistent power supply conditions exist and it is necessary to provide power from an alternate power source, such as an uninterruptible power supply or some other back-up power supply source. The back-up power supply switch 135 may be controlled by the power supply controller 125 to open the back-up power supply switch 135 when the power sensing module detects more consistent, stable power quality conditions associated with the power supply 105 and reliance on a back-up power supply is no longer required.

Still referring to FIG. 1A, the power supply control system 120 also includes a capacitor 140. The capacitor 140 operates to stabilize the voltage and power flow to the power load of the data center 110 in the event of minor, short-duration power outages or power disruptions. The capacitor 140 may be used temporarily, similar to a battery during these situations and may provide a short term source of power to a load during the transition to a back-up power supply. In some implementations, the power supply control system 120 can include a rechargeable battery in place of the capacitor 140 to provide short-term back up power supply As shown in FIG. 1A, the example architecture 100 includes a back-up power supply system 145. The back-up power supply system 145 provides a back-up source of power to a power load, such as the data center 110, when power disruptions, power outages or poor power conditions exist in the primary power supply, such as power supply 105. The back-up power supply 145 includes a back-up power supply controller 150, and a plurality of primary battery banks 155. The plurality of primary battery banks 155 include one or more individual primary battery banks 160 (individually labelled as primary battery bank 160a-160d). Each primary battery bank 160 is located within a temperature controlled enclosure 165 that is capable of heating, cooling, and maintaining the temperature of the primary battery bank 160 contained therein. The back-up power supply system 145 also includes a plurality of battery condition sensors 170 and a plurality of battery switches 175. The back-up power supply system 145 includes power lines, shown as solid lines, conveying power from each primary battery bank 160 to the power supply control system 120. Additionally, or alternatively, the back-up power supply system 145 includes control lines, shown as dashed lines, conveying control data between the back-up power supply controller 150, the plurality of battery condition sensors 170, the plurality of battery switches 175, and the power supply controller 125.

As mentioned above and as shown in FIG. 1A, the back-up power supply 145 includes a back-up power supply controller 150. The back-up power supply controller 150 includes one or more processors configured to monitor the condition of the plurality of primary battery banks maintained in a long-term storage state and the condition of the primary battery banks maintained in the operable state. For example, the back-up power supply controller 150 may query the battery condition sensors 170 to determine the condition and/or temperature of one or more of the primary battery banks 160. Based on the condition and/or temperature of one or more of the primary battery banks 160, the back-up power supply controller 150 may further transmit instructions to one or more of the battery switches 170 to connect or disconnect the output of a respective primary battery bank 160. The back-up power supply controller 150 provides the means to connect or disconnect each primary battery bank 160 in order to facilitate the provision of back-up power from a respective primary battery bank 160 to the power load, for example the data center 110, in the event of a power disruption or power outage. In some implementations, the back-up power supply controller 150 may include a memory to store battery condition data. For example, the back-up power supply controller 150 may store battery condition data indicating how long each primary battery bank in the back-up power supply system 145 has been maintained in a long-term storage state. Additionally, or alternatively, the back-up power supply controller 150 may store battery condition data indicating how long each primary battery bank in the back-up power supply system 145 has been maintained in an operable state and for how much time the primary battery bank has actually output power. In some implementations, the back-up power supply controller 150 may store battery condition data for use in determining if the output voltage or other performance characteristic of the working battery is above or below a performance threshold. In other implementations, the back-up power supply controller 150 may store battery condition data for use in determining if the remaining shelf-life or operating time of the working battery is above or below a capacity threshold.

As shown in FIG. 1A, the back-up power supply system 145 includes a plurality of primary battery banks 155. The plurality of primary battery banks 155 include one or more individual primary battery banks 160 that are arranged in parallel. In some implementations, the plurality of primary battery banks 155 may include a combination of multiple parallel sub-banks. In some implementations, the cells of each primary battery bank 160 may be arranged in series or the cells may be arranged in a hybrid configuration such that the cells are arranged in series and in parallel. As a person of ordinary skill in the art would recognize, a "primary battery" refers to a non-rechargeable battery. The primary battery banks 160 may include one or more primary batteries such as alkaline batteries, aluminum-air batteries, zinc-air batteries, lithium-air batteries, and magnesium batteries. In some implementations one or more of the primary battery banks 160 may be replaced with a rechargeable battery or rechargeable battery bank. For example, in some implementations, the one or more primary battery banks 160 may include a rechargeable battery, such as a Zinc-Manganese Dioxide rechargeable battery. In these implementations, the rechargeable battery or rechargeable battery bank may also benefit from long-term storage in temperature controlled conditions.

Still referring to FIG. 1A, each of the primary battery banks 160 are located in a respective temperature controlled enclosure 165. Each temperature controlled enclosure 165 maintains the primary battery bank 160 enclosed therein at a specified temperature depending on the desired state of the primary battery bank as indicated by the back-up power supply controller 125. In this example implementation, primary battery banks 155 maintained in a long-term storage state are maintained in a refrigerated state to prolong their shelf life. In some implementations, the primary battery banks in the long-term storage state are refrigerated at a temperature between −5 degrees Celsius and 10 degrees Celsius. As will be described in more detail later, one of the primary battery banks 160 is designated as a working battery. The working battery is maintained in or heated to a non-refrigerated, ready-to-discharge operable state and can serve as a back-up power supply to the power load. In some implementations, more than one primary battery bank can simultaneously serve as the working battery, spreading the power load over multiple primary battery banks.

As further shown in FIG. 1A, the back-up power supply system 145 includes a plurality of battery condition sensors 170. The battery condition sensors 170 are connected to each respective primary battery bank 160 and include one or more processors configured to monitor the condition of each primary battery bank. The battery condition sensors 170 are configured to determine the voltage, resistance, temperature, or output current of the respective primary battery bank 160 to which the battery condition monitor 170 is connected. As will be described in more detail later, in some implementations, the battery condition sensors 170 are configured to determine if the condition of the primary battery bank designated as the working battery is below a performance threshold or a capacity threshold.

Still referring to FIG. 1A, the back-up power supply system 145 includes a plurality of battery switches 175. The battery switches 175 may include, but are not limited to electromagnetic relays, electromechanical relays, or any other switch type suitable for controlling transmission of high-power power supplies. The battery switches 175 facilitate connecting and disconnecting the output of each of the respective primary battery bank 160 such that each of the primary battery banks can supply back-up power supply to a power load. The battery switches 175 may be opened or closed by the back-up power supply controller 150 via control lines shown with dashed lines in FIG. 1A. In some implementations, a primary battery bank 160 may be designated as the working battery to provide the back-up power supply to the power load. Once designated, the battery switch 175 that is associated with the designated primary battery bank 160 may be controlled by the back-up power supply controller 150 to close the battery switch 175 and provide back-up power to the power load from the designated working battery. The battery switch 175 may be controlled by the back-up power supply controller 150 to open the battery switch 175 when the primary battery bank 160 is no longer designated as the working battery supplying the back-up power to the power load.

Figure 1B:
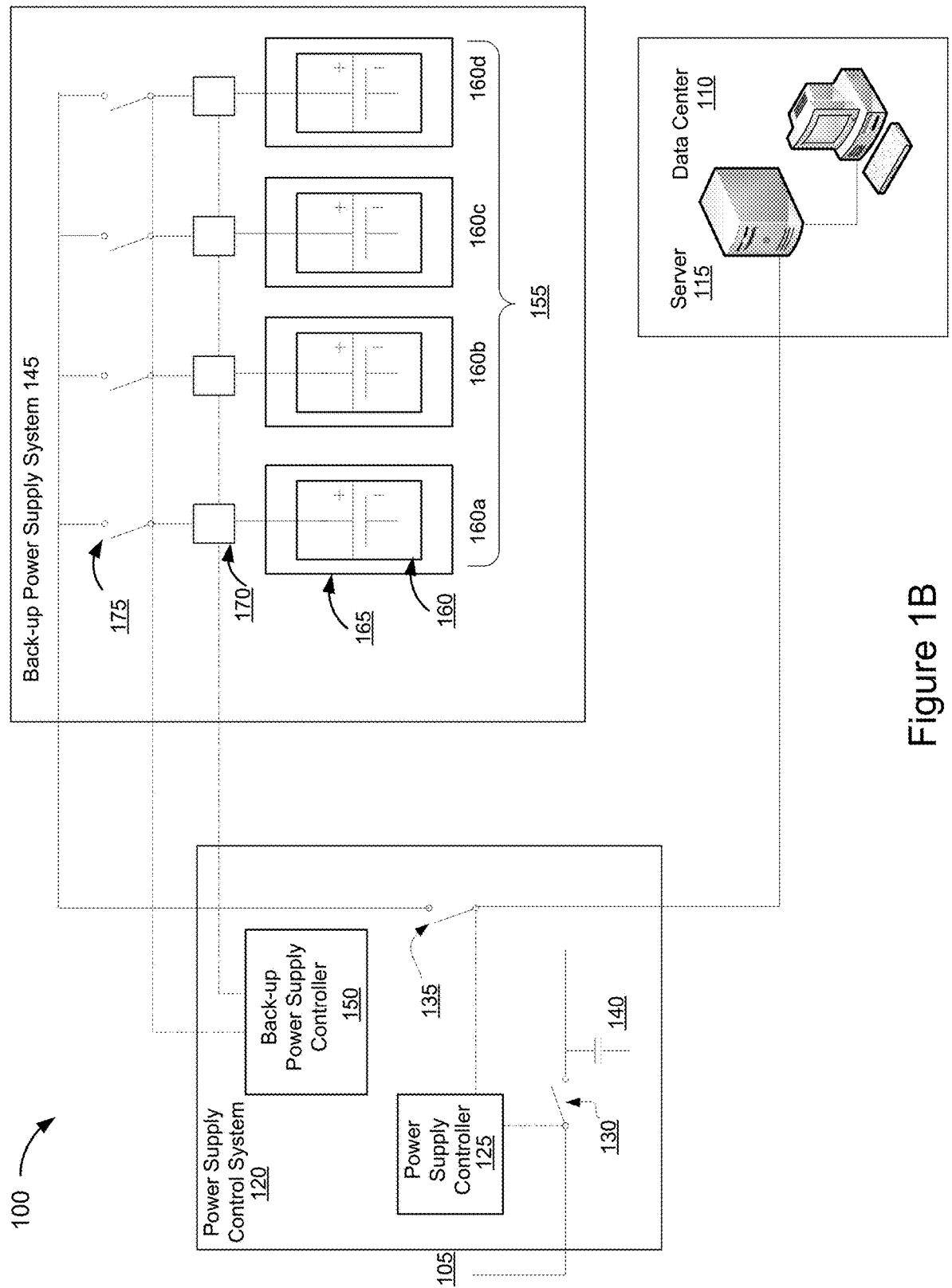

FIG. 1B is a block diagram of another example architecture 100 for an uninterruptible power supply system 100. In broad overview, the uninterruptible power supply system 100 includes a power supply control system 120 and a back-up power supply system 145. The architecture, functionality, and operation of the uninterruptible power supply system 100 shown in FIG. 1B is similar to the architecture, functionality, and operation of the uninterruptible power supply system 100 shown in FIG. 1A. However, in contrast to the uninterruptible power supply 100 shown in FIG. 1A, in FIG. 1B, the back-up power supply controller 150 is included in the power supply control system 120 instead of being included in the back-up power supply system 145.

The uninterruptible power supply system 100 or 100, shown in FIG. 1A or 1B, respectively, may also be configured with a back-up power supply system 145 wherein each of the primary battery banks in the plurality of primary battery banks maintained in a long-term storage state are stored without battery electrolyte as an alternative to refrigerating the plurality of primary battery banks. The battery electrolyte consists of soluble salts, acids or other bases in liquid or gelled formats. The battery electrolyte serves as the catalyst to make the battery conductive by promoting the movement of ions from the anode to the cathode during discharge of the battery. Primary battery banks stored in a long-term storage state without battery electrolyte do not require temperature controlled enclosures to maintain the batteries in the long-term storage state. In some implementations, the back-up power supply system 145 may include means to add battery electrolyte to a primary battery bank stored in a long-term storage state without battery electrolyte and thereby transition the primary battery bank to an operable state when designated as the working battery. In some implementations, the back-up power supply system may be configured to include a combination of a plurality of primary battery banks maintained in a long-term storage state without battery electrolyte and a plurality of primary battery banks maintained in a long-term storage state using refrigeration. In other implementations, the back-up power supply may be configured such that the plurality of primary battery banks are refrigerated and do not include battery electrolyte. In implementations where the plurality of primary battery banks are refrigerated and do not include battery electrolyte, the electrolyte used to fill the primary battery bank can be selected to assist warming the primary battery bank maintained in a long-term storage state to an operable state. For example, the primary battery banks can be filled with a solid electrolyte, which when added to the primary battery bank, causes an exothermic reaction that can heat the battery. In other implementations where the primary battery banks are filled with a liquid electrolyte, such as water, the electrolytes can be pre-warmed.

Figure 2A:
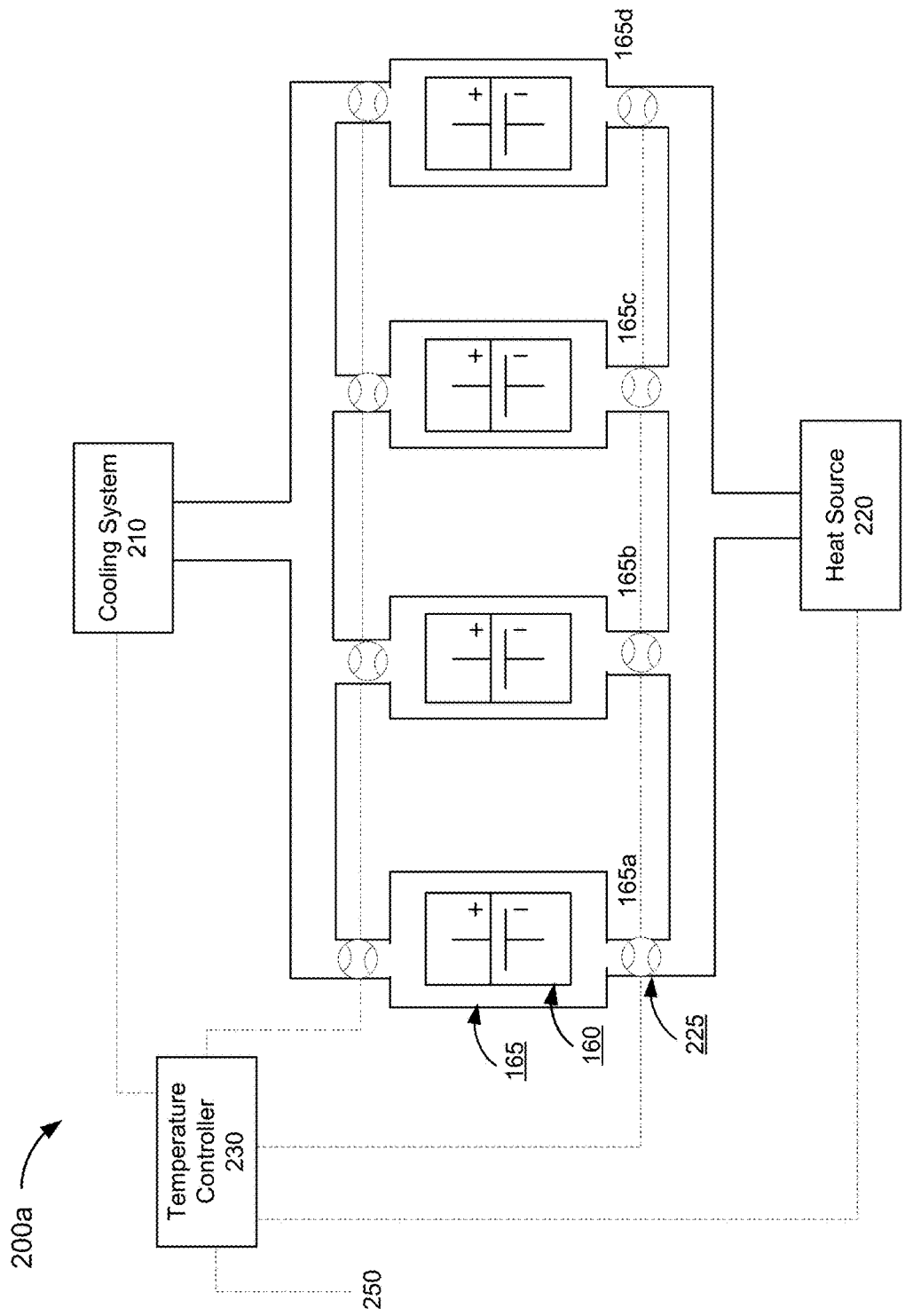
FIGS. 2A and 2B are block diagrams of example architectures for a temperature control system connected to an uninterruptible power supply system according to some implementations.

FIG. 2A is a block diagram of example architecture for a temperature control system 200 connected to a back-up power supply system 145. The temperature control system provides heating and cooling for the plurality of temperature controlled enclosures housing the primary battery banks 160. In some implementations, each temperature controlled enclosure 165 may be configured with a dedicated temperature control system 200a to individually supply heating or cooling to the primary battery banks 160 contained within each temperature controlled enclosure 165. The temperature control system includes a cooling system 210, a heat source 220, a plurality of dampers 225, a temperature controller 230, and a temperature control input source 250, such as back-up power supply controller 150. In some implementations, the temperature controller 230 may be included within the back-up power supply controller 150.

As shown in FIG. 2A, the temperature control system includes a cooling system 210. The cooling system 210 is connected via control lines (shown in dashed lines) to the temperature controller 230. The cooling system 210 enables the temperature controlled enclosures 165 containing the primary battery banks to be maintained in a long-term storage state (e.g., a refrigerated state). The cooling system 210 may be configured to supply cold air to the individual temperature controlled enclosures 165 in order to maintain the primary battery banks 160 contained therein at a temperature between about −5 degrees Celsius and about 10 degrees Celsius. In some implementations, the cooling system may maintain the primary battery banks 160 contained therein at a temperature between about −5 degrees Celsius and about 15 degrees Celsius. In other implementations, the cooling system may maintain the primary battery banks 160 contained therein at a temperature between about −5 degrees Celsius and about 20 degrees Celsius. In some implementations, the cooling system 210 may be configured to provide cooling to the individual temperature controlled enclosures 165 using a fluid such as water or some other coolant that may be circulated through each enclosure to maintain the primary battery bank in a refrigerated state. In some implementations, the cooling system 210 may be configured to maintain at least one primary battery banks contained in respective temperature controlled enclosures 165 at an intermediate temperature, as will be explained further in relation to FIG. 5. In some implementations, the cooling system 210 may be configured to maintain a primary battery bank designated as a working battery contained in one of the temperature controlled enclosures 165 within a range of temperatures deemed to be optimal for powering a load, for example, to avoid the battery bank from overheating.

Still referring to FIG. 2A, the temperature control system includes a heat source 220, such as a furnace. The heat source 220 is connected via control lines (shown in dashed lines) to the temperature controller 230. In some implementations, the heat source 230 may be configured to warm the primary battery banks 160 contained in the temperature controlled enclosures 165 to an operable state. In some implementations, the heat source 230 may be configured to warm respective primary battery banks 160 contained in the temperature controlled enclosures 165 to either an intermediate or an operable state.

Referring again to FIG. 2A, the temperature control system includes a plurality of dampers 225. The plurality of dampers 225 may include valves, actuators or other means of controlling the flow of air (or other fluid) from the cooling system 210 and heating system 220 to the temperature controlled enclosures 165. The dampers 225 operate to control the amount of cooling or heat supplied to each individual temperature controlled enclosure 165 and to the primary battery bank 160 contained therein. The dampers 225 receive control input from the temperature controller 230 via the control lines associated with each respective damper 225. For example, based on input received from the temperature controller 230, the primary battery bank 160, contained within the temperature controlled enclosure 165a, may be warmed from a refrigerated state to an operational state. The temperature controller 230 may transmit control signals to the damper 225 associated with temperature controlled enclosure 165a to close the damper, valve, or actuator controlling the flow of air from the cooling system 210 and open the damper, valve, or actuator controlling the flow of air from the heat source 220. Similarly, if the temperature controller 230 received input to warm a second temperature controlled enclosure (e.g., temperature controlled enclosure 165b), the dampers 225 connected to temperature controlled enclosure 165b would be actuated to allow the heat source to warm the primary battery bank contained in that temperature controlled enclosure 165b and prevent the cooling system from providing further cooling to the temperature controlled enclosure 165b.

As shown in FIG. 2A, the temperature control system includes a temperature controller 230. The temperature controller 230 is connected to each respective damper 225 via control lines shown with dashed lines in FIG. 2A. The temperature controller 230 is also connected to the cooling system 210 and the heating source 220 via control lines shown with dashed lines in FIG. 2A. In some implementations, the temperature controller 230 may be included within the back-up power supply controller 150 shown in FIGS. 1A and 1B. In some implementations, the temperature controller 230 is a separate device. The temperature controller 230 receives a temperature control input 250, for example, from the back-up power supply controller 150. The temperature controller 230 is configured with one or more processors to receive an input signal, such as from temperature control input source 250, and adjust the temperature of a specific temperature controlled enclosure 165. The temperature controller 230 adjusts or maintains the temperature of a specific temperature controlled enclosure 165 (and primary battery 160 contained therein) by transmitting control signals to the cooling system 210, the heat source 220, and/or the respective dampers 225. For example, the temperature controller 230 may receive an input signal, such as a temperature control input signal 250 from the back-up power supply controller 150 to continue providing refrigeration to the temperature controlled enclosures 165 in order to maintain the plurality of primary battery banks in a long-term storage state. Additionally, or alternatively the temperature controller 230 may receive a temperature control input signal 250 to warm a primary battery bank to an operable state. The temperature controller 230 may transmit control signals to heat source 230 to initiate heat production. The temperature controller 230 may transmit control signals to the dampers 225 associated with the temperature controlled enclosure 165 and the designated working battery contained therein to raise the temperature of the enclosure and the working battery by allowing more heat to flow into the enclosure while restricting the cooling supply to the enclosure.

Figure 2B:
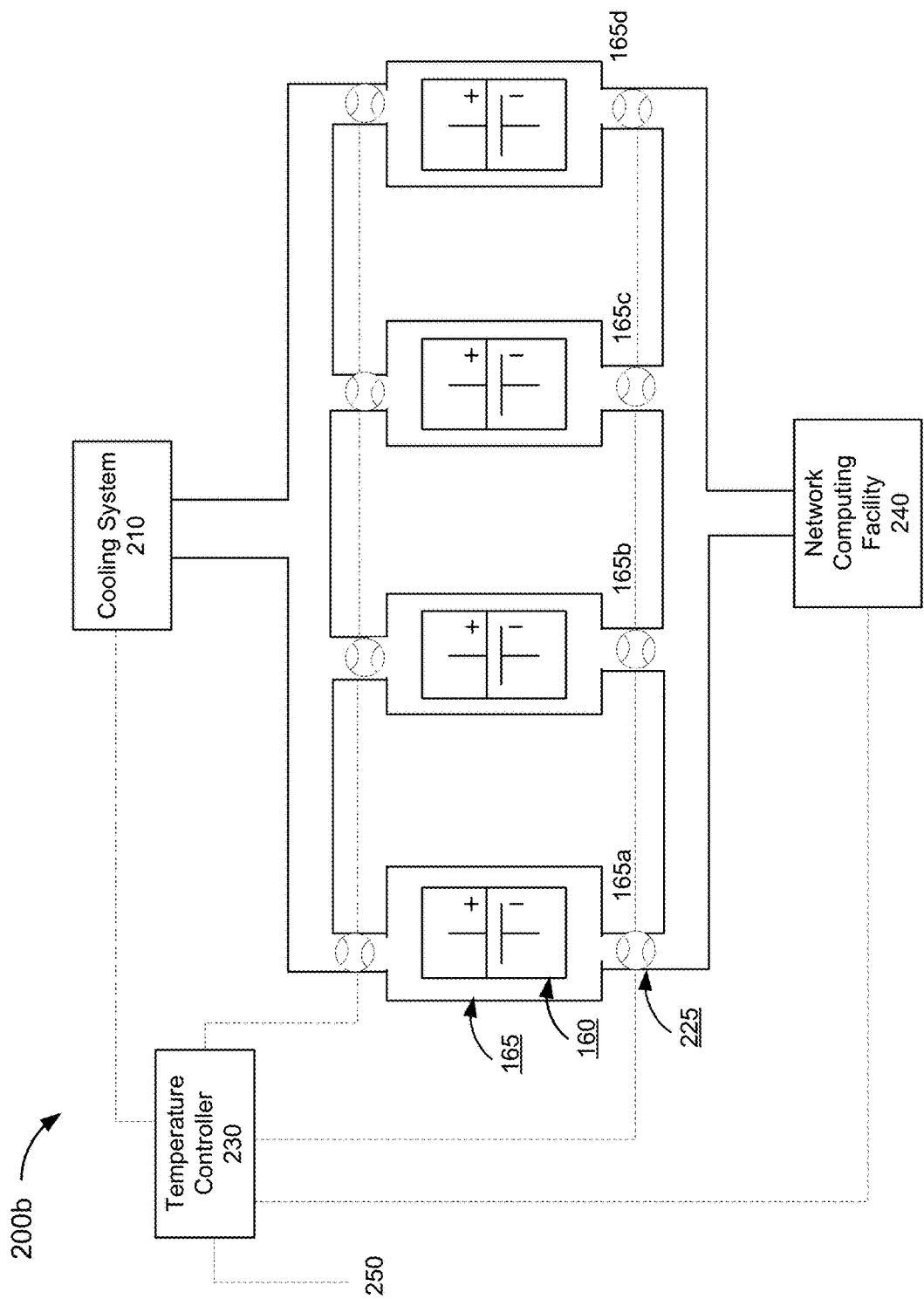

FIG. 2B is a block diagram of example architecture 200 for a temperature control system connected to a back-up power supply system 145. The architecture, functionality, and operation of the temperature control system shown in FIG. 2B is similar to the architecture, functionality, and operation of the temperature control system shown in FIG. 2A. However, in contrast to the temperature control system 200 shown in FIG. 2A, in the temperature control system 200 shown in FIG. 2B, the heat source (e.g., heat source 220 of FIG. 2A) is provided by the load to which the back-up power supply is providing power, for example a network computing facility 240, such as a data center or telecommunications system core. For example, the operation of the computers in the network computing facility 240 generates heat, which can be provided to the temperature control system 200 that is connected to the uninterruptible power supply 145 as a primary or an auxiliary heat source.

Figure 3:
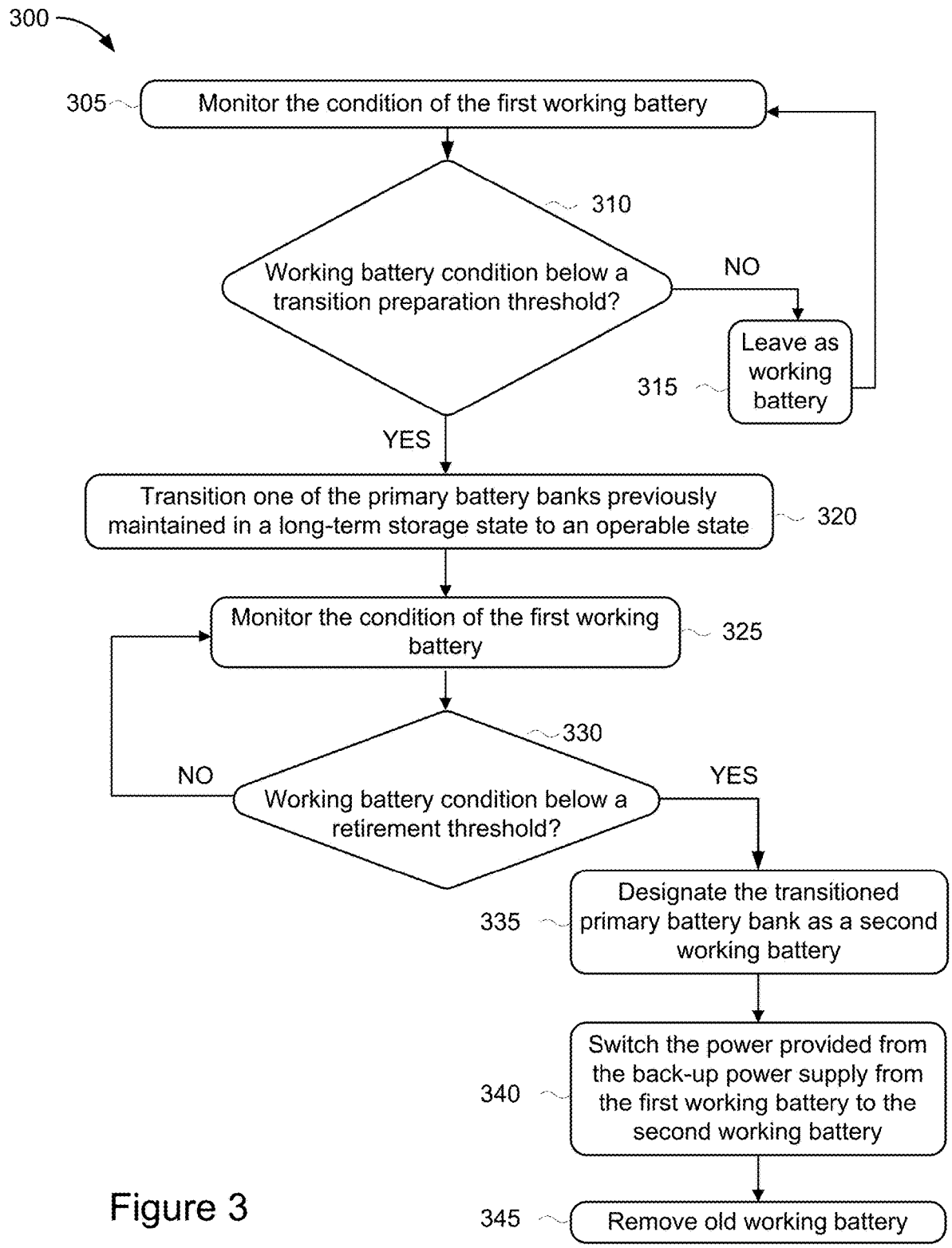
FIG. 3 is a flow chart showing operations of an uninterruptible power supply system according to some implementations.

FIG. 3 is a flow chart of a method 300 for providing back-up power using a back-up power supply system, such as the back-up power supply system 145 shown in FIG. 1A. The method 300 includes monitoring the condition of the first working battery (stage 305). The method also includes determining if the working battery condition is below a transition preparation threshold (stage 310). At stage 315, if the working battery condition is not below a transition preparation threshold, the back-up power supply system 145 leaves the current battery as the working battery. At stage 320, if the working battery condition is below a transition preparation threshold, the back-up power supply system 145 transitions one of the primary battery banks previously maintained in a long-term storage state to an operable state. The method further includes monitoring the condition of the first working battery (stage 325). The method includes determining if the working battery condition is below a retirement threshold (stage 330). If the working battery condition is not below the retirement threshold, the method includes monitoring the condition of the first working battery (stage 325). At stage 335, if the working battery condition is below the retirement threshold, the method includes designating the transitioned primary battery bank as a second working battery. The method further includes switching the power provided from the back-up power supply from the first working battery to the second working battery (stage 340) and removing the old working battery (stage 345).

At stage 305, the back-up power supply system 145 monitors the condition of the first working battery. For example, the battery condition sensors 170 may be configured to monitor the working battery's condition in terms of voltage, resistance, temperature, or the output current of the first working battery. In some implementations, the back-up power supply system 145 may periodically poll the battery condition sensors 170 to determine the battery conditions. The back-up power supply system 145 may store real-time and historical battery condition values in the back-up power supply controller 150. The stored battery condition values may be incorporated into data analytics and machine learning algorithms and used to calculate performance threshold values or capacity threshold values discussed further below.

At stage 310, the back-up power supply system 145 determines if the working battery condition is below a transition preparation threshold. A transition preparation threshold may be a value of a battery condition related to an amount of time it takes to transition a primary battery bank maintained in a long-term storage state to an operable state. In general, it is desirable for the back-up power supply system 145 to always have at least one primary battery bank in an operable condition. As it takes time for a battery bank in long-term storage to warm to an operable temperature, it is beneficial to begin warming the next battery bank to serve as a working battery bank well in advance of when it is actually called into service to reduce the potential for the current working battery bank failing without another battery bank being in an appropriate state to take over the supply of power. The transition preparation threshold therefore corresponds to a working battery condition in which the back-up power supply system 145 can have confidence that the current working battery will be able to continuously provide back-up power for at least some multiple of the amount of time it takes to transition a battery bank maintained in a long-term storage state to an operable state. In some implementations, the multiple may range from about 1.10 to 3.0. For more critical systems, larger multiples are preferred to provide additional time in case problems arise during the transition process.

The exact value of the transition preparation threshold may be determined by or supplied to the back-up power supply controller 150. For example, for primary battery bank types whose output characteristics over time are well characterized, the transition preparation threshold can be set to a given battery bank output value (e.g., voltage) known to be indicative of the battery bank being able to maintain a sufficient output for the requisite amount of time. A threshold based on the actual output characteristics of a battery bank is referred to herein as a performance threshold. In some implementations, the transition preparation threshold can be based purely on the amount of time the current working battery had been in long term storage, how long the working battery has been in an operable state, and the amount of current actually output by the working battery. Such information can be used to estimate a remaining capacity of the battery bank. In various implementations, the back-up power supply controller 150 can apply a shelf-life capacity threshold, i.e., a threshold based on the amount of time the battery bank can remain in an operable state without actually outputting power, and/or an operating time capacity threshold, i.e., the remaining amount of time power can be actively drawn from the battery bank. The shelf-life threshold and the operating time thresholds are referred to herein as "capacity thresholds."

At stage 315, if the back-up power supply system 145 determines that the working battery condition is not below a transition preparation threshold, the battery remains in operation as the working battery providing back-up power supply to the power load.

At stage 320, if the back-up power supply system 145 determines that the working battery condition is below the transition preparation threshold, the back-up power supply system 145 transitions one of the primary battery banks previously maintained in long-term storage to an operable state. For example, the back-up power supply system 145 may transition one of the primary battery banks previously maintained in a refrigerated state for long-term storage to an operable condition or state by warming the primary battery bank to a temperature at which the battery is ready to discharge. In some implementations, the back-up power supply system 145 may transition more than one of the primary battery banks previously maintained in a refrigerated state for long-term storage to an operable condition or state to provide a failover redundancy in the event one of the primary batter banks is defective or unable to operate as a fully functional working battery. The back-up power supply system 145 may transmit control signals to activate a temperature control system coupled to the plurality of primary battery banks so that the temperature of one or more of the temperature controlled enclosures 165 which contain each primary battery bank can be raised to bring the working battery to an operable state. In some implementations, the back-up power supply system 145 may transition one of the primary battery banks to an operable state by controlling the addition of battery electrolyte to a primary battery bank. For example, a plurality of primary battery banks could be maintained in long term storage such that each primary battery banks contains non-operable amount of (e.g., none) battery electrolyte. The back-up power supply system 145 may control robotic apparatus to add the battery electrolyte and transition the primary battery bank to an operable state.

At stage 325, the back-up power supply system 145 continues to monitor the condition of the first working battery as explained in the description of stage 305 above.

At stage 330, the back-up power supply system 145 determines if the working battery condition is below a retirement threshold. A retirement threshold may be a value corresponding to a battery bank condition associated with a point at which the battery has a minimal amount of power or capacity remaining, but has diminished the vast majority of its power or capacity and may soon be unable to continue discharging in an operable state as a back-up power supply. That is, the retirement threshold corresponds to the point in a primary battery bank's life that it should be replaced by another primary battery bank to avoid a potential power loss to the load. The back-up power supply controller 150 can determine whether the retirement threshold has been met based on one or more conditions of the working battery measured by the battery condition monitors 170 and/or based on the amount of time the primary battery bank has been in a long term storage state, an operable inactive state, and an operable active state.

For example, the battery condition monitors 170 may monitor the condition of a working battery and transmit battery condition data to the back-up power supply controller 150. The back-up power supply controller 150 may process the data to determine that one or more of the power output characteristics of the working battery has dropped below a level at which, based on the specified operating characteristics of the working battery, the battery conditions are, or will imminently be, insufficient to continue supplying back-up power to the load. As with the transition preparation threshold, the retirement threshold may be a performance threshold, a capacity threshold, or a threshold that is a function of both the performance and estimated capacity.

At stage 335, if the back-up power supply 145 determines that the working battery condition is below the retirement threshold, the back-up power supply system 145 designates the transitioned primary battery bank as a second working battery. Upon reaching an operable state, the transitioned primary battery bank is capable of providing back-up power to the load and is designated as a second working battery. In some implementations, the back-up power supply system 145 may transmit control signals to the temperature control system to which the designated second working battery is coupled and adjust the heating supply to the temperature controlled enclosure 165 containing the second working battery so that the second working battery is maintained at an operable, and in some implementations optimal discharge, temperature.

At stage 340, the back-up power supply system 145 switches the power provided form the back-up power supply from the first working battery to the second working battery. For example, the back-up power supply system 145 may transmit control signals to close the battery switch 175 associated with the second working battery. Closing the battery switch 175 associated with the second working battery connects the output of the second working battery to provide back-up power to the power load from the second working battery. The back-up power supply system 145 may further transmit control signals to open the battery switch 175 associated with the first working battery and thereby disconnect the output of the first working battery from the power load. In some implementations, alternate switching methods may be utilized which allow the switch controlling the second working battery to be closed (e.g., connecting the output of the second working battery) in order to provide back-up power from the second working battery in parallel with the first working battery until the switch controlling the first working battery is opened (e.g., disconnecting the output of the first working battery).

At stage 345, the first working battery is retired from the back-up power supply system 145. For example, the first working battery may be removed from the temperature controlled enclosure 165 that contained the first working battery and a new primary battery bank may be added to the enclosure to replenish the number of primary battery banks in the back-up power supply system 145.

Figure 4:
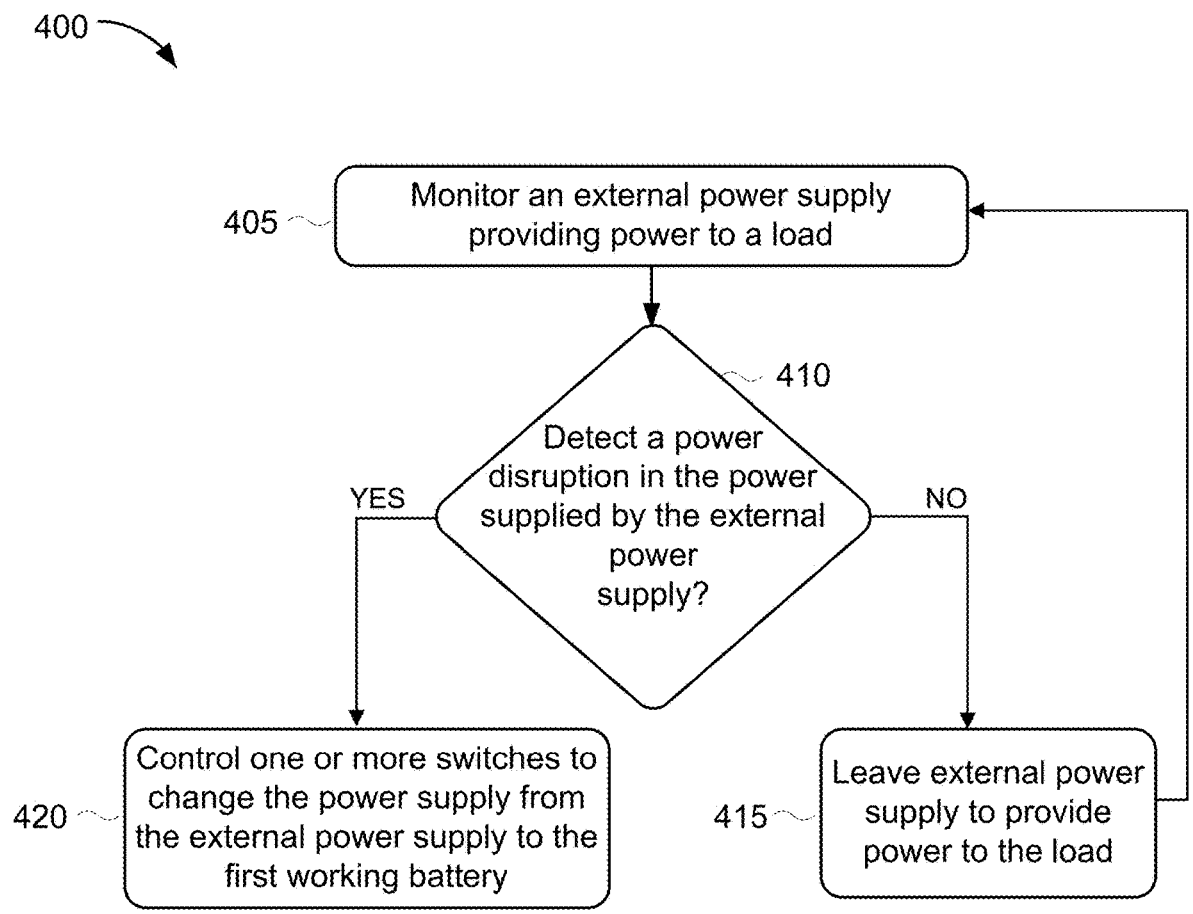
FIG. 4 is a flow chart showing operations of a power supply control system according to some implementations.

FIG. 4 is a flow chart of a method 400 for managing a power supply by a power supply control system, such as power supply control system 120 shown in FIG. 1A. The method 400 includes monitoring an external power supply providing power to a load (stage 405). The method also includes detecting, by the power supply control system 120, a power disruption in the power supplied by the external power supply (stage 410). If the power supply control system 120 does not detect a power disruption in the power supplied by the external power supply, the external power supply continues to provide power to the load (stage 415).

If the power supply control system 120 detects a power disruption in the power supplied by the external power supply, the power supply control system 120 controls one or more switches to change the power supply from the external power supply to the first working battery (stage 420).

At stage 405, the power supply control system 120 monitors an external power supply providing power to a load. For example, a power supply control system 120 may include one or more processors configured to monitor the power supply 105 providing power to a load, such as data center 110. The power supply 105 may be monitored for a variety of conditions such as disruptions in the power supply. Power disruptions can include a broad range of conditions including power outages (e.g., a loss of power), as well as inconsistent power, noise or unstable frequency oscillations, or harmonic distortions. For example, the power supply 105 may be monitored for voltage spikes, sustained overvoltage or consistently low voltage.

At stage 410, the power supply control system 120 may detect a power disruption in the power supplied by the external power supply. For example, power supply control system 120 may detect a power disruption in power supply 105. The power supply control system 120 may include one or more processors configured in a power supply controller 125 which operates to detect various types of power disruptions. In some implementations, the power supply controller 125 may include a memory storing measurement data and thresholds associated with the power supply to which it is connected. The power supply controller 125 may compare real-time measurements of the power supply 105 to stored values and/or thresholds to determine that a power disruption has been detected.

At stage 415, if the power supply control system 120 does not detect a power disruption in the power supplied by the external power supply, the power supply control system 120 leaves the external power supply to provide power to the load. The external power supply providing power to the power load is continuously monitored by the power supply control system 120 until a power disruption is detected.

At stage 420, if the power supply control system 120 detects a power disruption in the power supplied by the external power supply, the power supply control system 120 is configured to control one or more switches to change the power supply from the external power supply to the first working battery. For example, upon detecting a power disruption in power supply 105, the power supply controller 125 may transmit control signals to open the power supply switch 130, thereby disconnecting the power supplied by power supply 105 to the power load. Additionally, the power supply controller 125 may transmit control signals to close the back-up power supply switch 135, thereby connecting the output of the back-up power supply system 145 to the power load. The power supply controller 125 may further transmit control signals to the back-up power supply controller 150 to close the battery switch 175, thereby connecting the output of the first working battery 160a to the power load 160a.

Figure 5A:
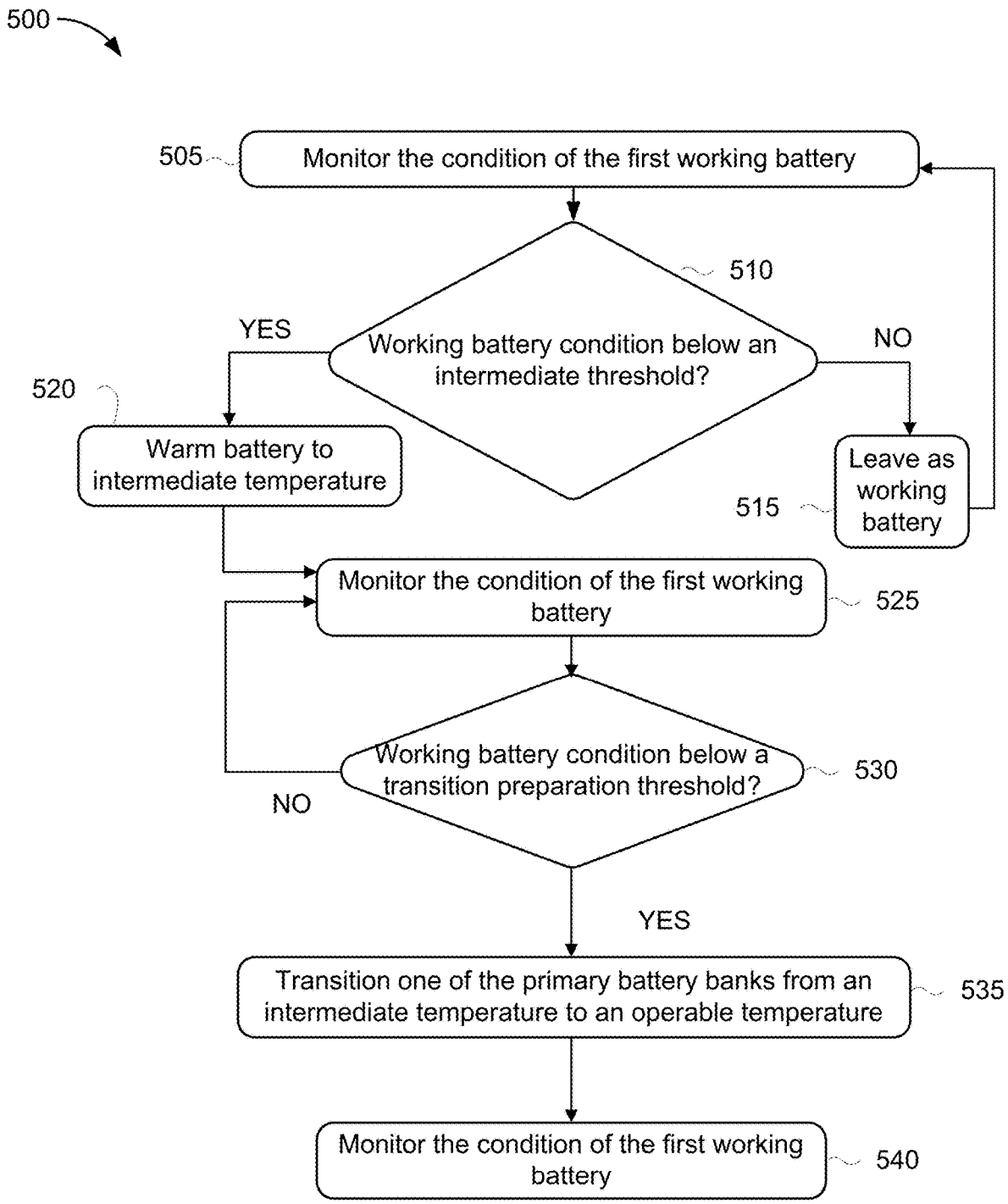
FIGS. 5A and 5B are flow charts representing an example of operations of an uninterruptible power supply system according to some implementations.
Figure 5B:
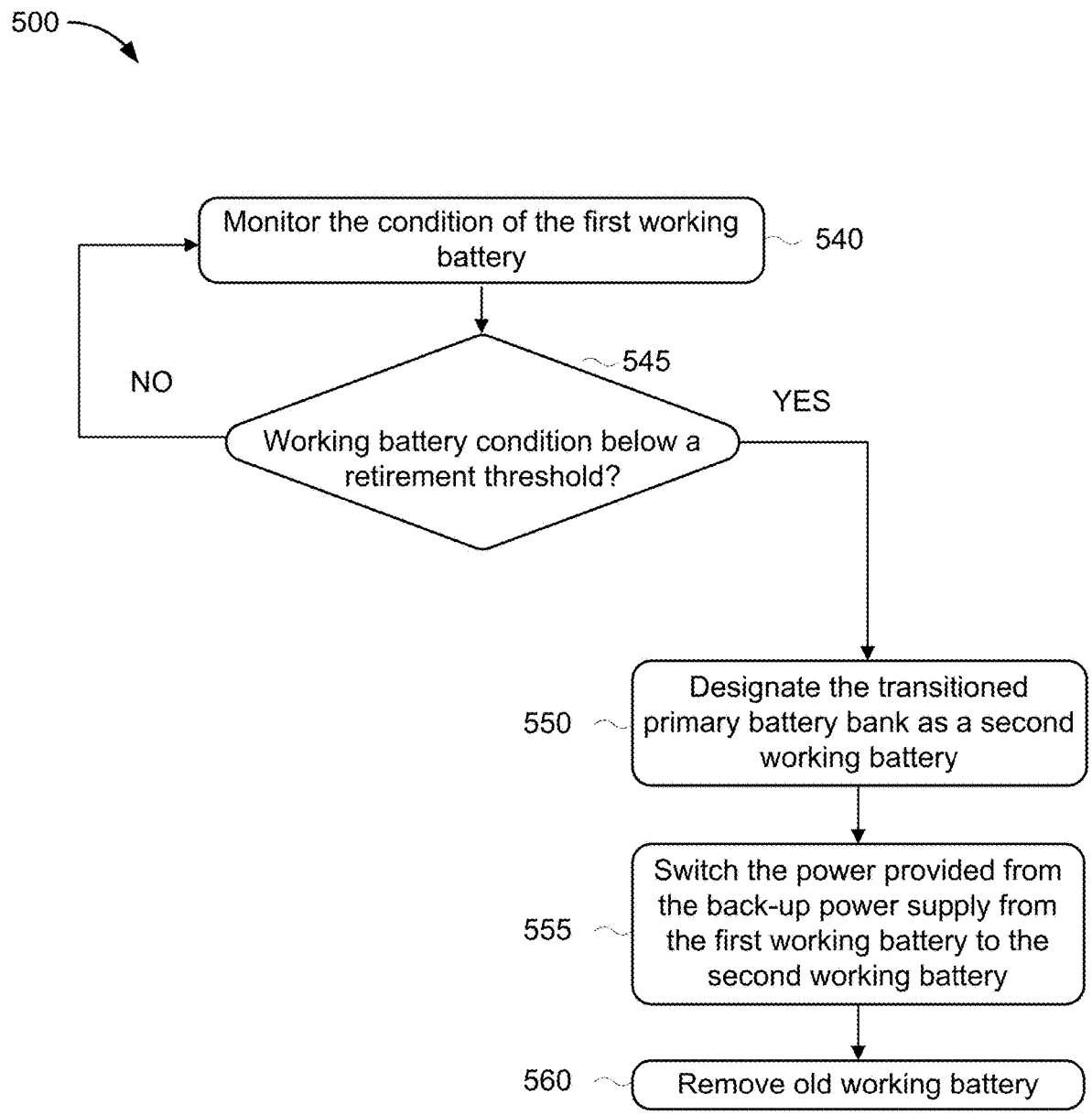

FIGS. 5A and 5B are flow charts of a method 500 for monitoring the condition of the first working battery to provide back-up power performed by a back-up power supply system, such as the back-up power supply system 145 shown in FIG. 1A or the back-up power supply system 145 shown in FIG. 1B. The method 500 utilizes additional transition thresholds and additional battery states relative to the method 300 shown in FIG. 3. In general, power disruptions and outages are often quite short in duration, though by their nature, the duration of most power disruptions (other than planned power disruptions) are not known in advance. Accordingly, when applying the method 300, one or more primary battery banks may be transitioned from a long-term storage state to an operable state upon a determination that the current working battery will only be able to supply a load for between 1.1-3.0 times the amount of time it takes to bring a primary battery bank in the long-term storage state into the operable state. In reality, it may take many more times that amount of time (possibly days, months, or even years) before the current working battery actually needs to be retired. During this possibly extended period of time, the capacity of the battery bank transitioned to the operating state decreases through self-discharge.

To limit the amount of self-discharge associated with a premature transition of a primary battery bank to the operating state, in the method 500, after the condition of a working battery falls below an intermediate threshold, but before it falls below a transition preparation threshold, a battery bank previously maintained the in long term storage state is raised to an intermediate temperature. Such a battery will still experience some increased self-discharge, but less than if it were raised to the fully operable state. At the same time, transitioning the battery bank to the fully operable state will take less time as it is already at a higher temperature. Therefore, the transition preparation threshold for a working battery can be set closer to the retirement threshold of the primary battery bank, allowing the replacement battery bank to be kept cooler for more time, limiting self-discharge and increasing the lifespan of the backup power supply.

The method 500 includes monitoring the condition of the first working battery (stage 505). The method also includes determining if the working battery condition is below an intermediate threshold (stage 510). At stage 515, if the working battery condition is not below an intermediate threshold, the back-up power supply system 145 leaves the current battery as the working battery. At stage 520, if the working battery condition is below an intermediate threshold, the back-up power supply system 145 warms the battery to an intermediate temperature. The method further includes monitoring the condition of the first working battery (stage 525). The method includes determining if the working battery condition is below a transition preparation threshold (stage 530). If the working battery condition is not below a transition preparation threshold, the method includes monitoring the condition of the first working battery (stage 525). At stage 535, if the condition of the first working battery is below a transition preparation threshold, the method includes transitioning one of the primary battery banks from an intermediate temperature to an operable temperature. The method further includes monitoring the condition of the first working battery (stage 540). As shown in FIG. 5B, the method 500 continues from stage 540 (the stage 540 of FIG. 5A) and further includes determining if the working battery condition is below a retirement threshold (stage 545). If the working battery condition is not below a retirement threshold, the method includes monitoring the condition of the first working battery (stage 540). At stage 550, if the working battery condition is below the retirement threshold, the method includes designating the transitioned primary battery bank as a second working battery. The method further includes switching the power provided from the back-up power supply from the first working battery to the second working battery (stage 555) and removing the old working battery (stage 560).

At stage 505, the back-up power supply system 145 monitors the condition of the first working battery. In some implementations, the battery condition sensors 170 may be configured to monitor the first working battery's condition in voltage, resistance, temperature, or the output current of the first working battery. In some implementations, the back-up power supply system 145 may periodically poll the battery condition sensors 170 to determine the battery conditions. The back-up power supply system 145 may store real-time and historical battery condition values in the back-up power supply controller 150. The stored battery condition values may be incorporated into data analytics and machine learning algorithms and used to calculate performance threshold values or capacity threshold values discussed herein.

At stage 510, the back-up power supply system 145 determines if the first working battery is below an intermediate threshold. The intermediate threshold, like the transition preparation threshold described above with respect to FIG. 3 can be a performance threshold, a capacity threshold, or a combination or function of the two. In some implementations, the intermediate threshold in the method 500 can be set to about the same value as the transition preparation threshold used in the method 300, i.e., to a value associated with a remaining operating time of the current working battery equal to about 1.1 to about 3.0 times the amount of time it takes to fully transition a primary battery bank in long-term storage state to the fully operable state.

At stage 515, if the back-up power supply system 145 determines that the working battery condition is not below an intermediate threshold, the battery remains in operation as the working battery providing back-up power supply to the power load.

At stage 520, if the back-up power supply system 145 determines that the working battery condition is below an intermediate threshold, the back-up power supply system 145 warms one or more primary batteries previously maintained in a long-term storage state to an intermediate temperature. The intermediate temperature can be a temperature that is between 25% and 75%, e.g., about 50% of the way between the long-term storage temperature and the operable temperature. To initiate the warming, the back-up power supply system 145 may transmit control signals to activate a temperature control system coupled to the next working battery so that the temperature of the temperature controlled enclosure 165 which contain the next working battery is raised, thereby bringing the next working battery to the intermediate temperature. At stage 525, the back-up power supply system 145 continues to monitor the condition of the first working battery after the next working battery has been warmed to the intermediate temperature.

At stage 530, the back-up power supply system 145 determines if the working battery is below a transition preparation threshold. As discussed above, the transition preparation threshold for a working battery in the method 500 can be closer to the retirement threshold for the working battery than in the method 300, as it will take less time to heat a replacement battery bank from the intermediate temperature to the final operable temperature. The exact value will depend in part on the temperature set as the intermediate temperature. For example, for an intermediate temperature that is at about the midpoint between the long-term storage temperature and the operable temperature, the transition preparation threshold can be set to value associated with a battery that has an expected remaining operating time of between about 0.6 and 1.5 times the amount of time it takes to transition the battery bank from the long-term storage state to the operable state, or about 1.2 to about 3.0 times the amount of time it would take to transition the battery bank from the intermediate temperature to the operable temperature.

At stage 535, if the back-up power supply system 145 determines that the working battery condition is below a transition preparation threshold, the back-up power supply system 145 transitions one or more of the primary battery banks from an intermediate temperature to an operable temperature. For example, the back-up power supply system 145 may transmit control signals to the temperature control system to warm a second working battery to an operable state temperature in preparation for replacement of the first working battery since the output current of the first working battery has fallen below the transition preparation threshold.

At stage 540, the back-up power supply system 145 continues to monitor the condition of the first working battery after the second working battery has been transitioned to an operable temperature.

The method 500 continues in FIG. 5B, at stage 545, where the back-up power supply system 145 determines if the working battery condition is below a retirement threshold. The retirement threshold used in the method 500 can be the same or similar to the retirement threshold used in the method 300. If the back-up power supply system 145 determines that the working battery condition is not below a retirement threshold, the battery bank remains in operation as the working battery providing back-up power supply to the power load and the back-up power supply system 145 continues to monitor the condition of the first working battery (stage 540).

At stage 550, if the back-up power supply 145 determines that the working battery condition is below the retirement threshold, the back-up power supply system 145 designates the transitioned primary battery bank as a second working battery. Upon reaching an operable state, the transitioned primary battery bank is capable of providing back-up power to the load and is designated as a second working battery. In some implementations, the back-up power supply system 145 may transmit control signals to the temperature control system to which the designated second working battery is coupled and adjust the heating supply to the temperature controlled enclosure 165 containing the second working battery so that the second working battery is maintained at an operable temperature.

At stage 555, the back-up power supply system 145 switches the power provided form the back-up power supply from the first working battery to the second working battery. For example, the back-up power supply system 145 may transmit control signals to close the battery switch 175 associated with the second working battery. Closing the battery switch 175 associated with the second working battery connects the output of the second working battery to provide back-up power to the power load from the second working battery. The back-up power supply system 145 may further transmit control signals to open the battery switch 175 associated with the first working battery and thereby disconnect the output of the first working battery from the power load. In some implementations, alternate switching methods may be utilized which allow the switch controlling the second working battery to be closed (e.g., connecting the output of the second working battery) in order to provide back-up power from the second working battery in parallel with the first working battery until the switch controlling the first working battery is opened (e.g., disconnecting the output of the first working battery).

At stage 560, the first working battery is retired from the back-up power supply system 145. For example, the first working battery may be removed from the temperature controlled enclosure 165 that contained the first working battery and a new primary battery bank may be added to the enclosure to replenish the number of primary battery banks in the back-up power supply system 145.

Figure 6:
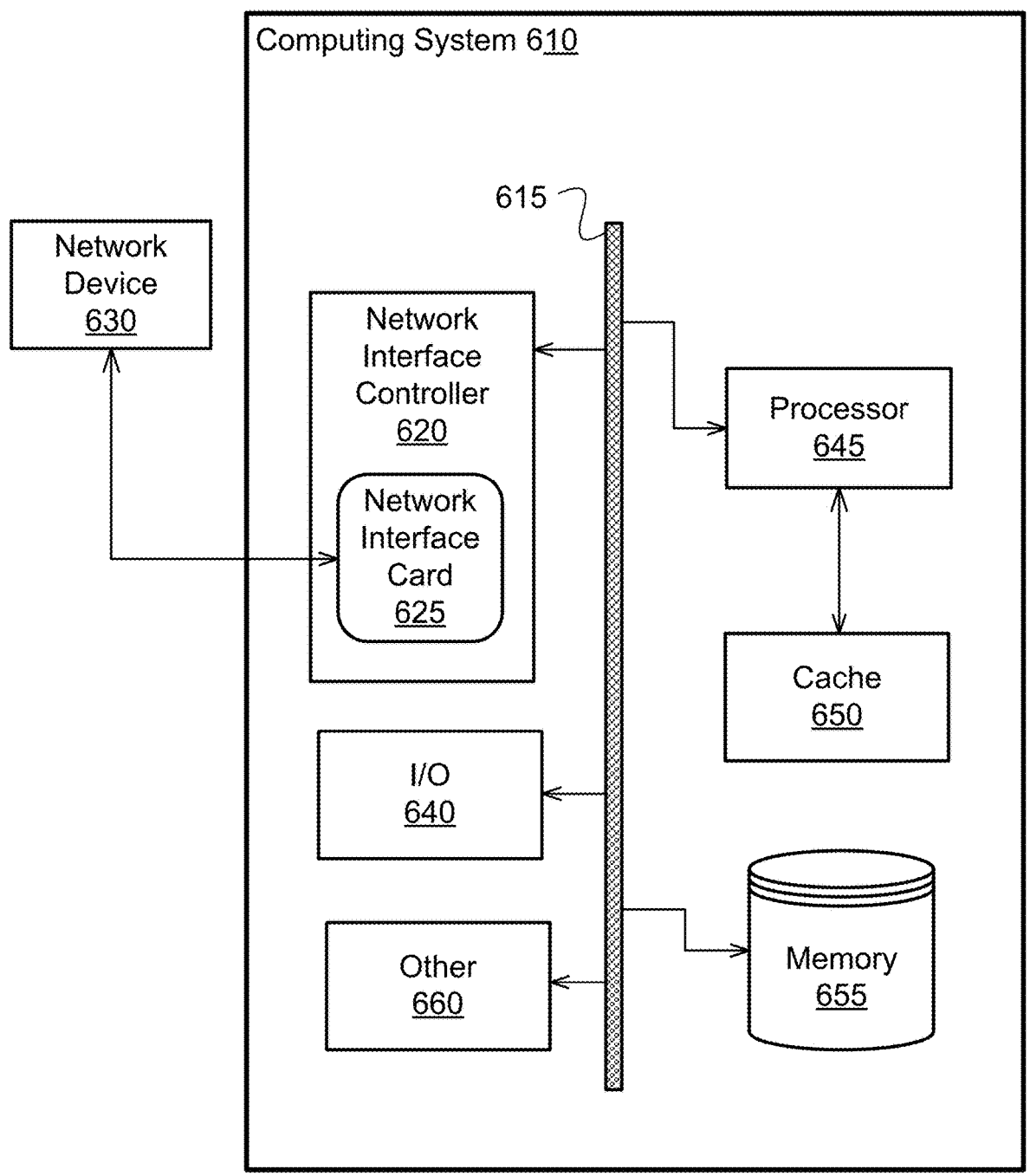
FIG. 6 is a block diagram of an example computing system.

FIG. 6 is a block diagram illustrating a general architecture for a computer system 600 that may be employed to implement elements of the systems and methods described and illustrated herein, according to an illustrative implementation, such as the power supply controller 125 or back-up power supply controller 150 shown in FIG. 1A or 1B, as well as the temperature controller 230 shown in FIGS. 2A and 2B.

In broad overview, the computing system 610 includes at least one processor 645 for performing actions in accordance with instructions and one or more memory devices 650 or 655 for storing instructions and data. The illustrated example computing system 610 includes one or more processors 645 in communication, via a bus 615, with at least one network interface controller 620 with one or more network interface cards 625 connecting to one or more network devices 630, memory 655, and any other devices 660, e.g., an I/O interface. The network interface card 625 may have one or more network interface driver ports to communicate with the connected devices or components. Generally, a processor 645 will execute instructions received from memory. The processor 645 illustrated incorporates, or is directly connected to, cache memory 650.

In more detail, the processor 645 may be any logic circuitry that processes instructions, e.g., instructions fetched from the memory 655 or cache 650. In many embodiments, the processor 645 is a microprocessor unit or special purpose processor. The computing device 600 may be based on any processor, or set of processors, capable of operating as described herein to perform the methods described in relation to FIGS. 3-5. The processor 645 may be a single core or multi-core processor. The processor 645 may be multiple processors. In some implementations, the processor 6450 can be configured to run multi-threaded operations. In some implementations, the processor 645 may be configured to operate and communicate data in an Internet-of-Things environment. In other implementations, the processor 645 may be configured to operate and communicate data in an environment of programmable logic controllers (PLC). In such implementations, the methods shown in FIGS. 3-5 can be implemented within the Internet-of-Things or PLC environments enabled by the functionality of the processor 645.

The memory 655 may be any device suitable for storing computer readable data. The memory 655 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 600 may have any number of memory devices 655.

The cache memory 650 is generally a form of computer memory placed in close proximity to the processor 645 for fast read times. In some implementations, the cache memory 650 is part of, or on the same chip as, the processor 645. In some implementations, there are multiple levels of cache 645, e.g., L2 and L3 cache layers.

The network interface controller 620 manages data exchanges via the network interface card 625 (also referred to as network interface driver). The network interface controller 620 handles the physical and data link layers of the OSI model for network communication. In some implementations, some of the network interface driver controller's tasks are handled by the processor 645. In some implementations, the network interface controller 620 is part of the processor 645. In some implementations, a computing system 610 has multiple network interface controllers 620. The network interface ports configured in the network interface card 625 are connection points for physical network links. In some implementations, the network interface controller 620 supports wireless network connections and an interface port associated with the network interface card 625 is a wireless receiver/transmitter. Generally, a computing device 610 exchanges data with other network devices 630 via physical or wireless links that interface with network interface driver ports configured in the network interface card 625. In some implementations, the network interface controller 620 implements a network protocol such as Ethernet.

The other network devices 630 are connected to the computing device 610 via a network interface port included in the network interface card 625. The other network devices 630 may be peer computing devices, network devices, or any other computing device with network functionality. For example, a first network device 630 may be a network device such as a hub, a bridge, a switch, or a router, connecting the computing device 610 to a data network such as the Internet.

The other devices 660 may include an I/O interface, external serial device ports, and any additional co-processors. For example, a computing system 610 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 600 includes an additional device 660 such as a coprocessor, e.g., a math co-processor can assist the processor 645 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An uninterruptible power supply system, comprising:
    a back-up power supply comprising a plurality of primary battery banks arranged in parallel, wherein at least one of the plurality of primary battery banks is maintained in a long-term storage state and a given one of the plurality of primary battery banks designated as a first working battery is maintained in an operable state;
    a temperature control system configured to maintain the at least one of the plurality of primary battery banks in the long-term storage state and to maintain the given one of the primary battery banks in the operable state, wherein the long-term storage state comprises a refrigerated state and the operative state comprises a state with a temperature higher than the refrigerated state;
    a plurality of battery condition sensors, wherein each of the plurality of battery condition sensors is configured to measure a condition of a corresponding primary battery bank of the plurality of primary battery banks; and
    a back-up power supply controller including one or more processors configured to:
        monitor the condition of the first working battery,
        determine if the condition of the first working battery is below a transition preparation threshold,
        responsive to a determination that the first working battery is below the transition preparation threshold, transition one of the primary battery banks previously maintained in the long-term storage state to the operable state, designate the transitioned primary battery bank as a second working battery, and switch source of power provided by the back-up power supply from the first working battery to the second working battery.

2. The system of claim 1 further comprising a power supply control system, wherein the power supply control system includes a processor configured to:
    monitor an external power supply providing power to a load,
    detect a power disruption in the power provided by the external power supply, and
    responsive to detecting the power disruption, control a first switch to change provision of power to the load from the external power supply to the back-up power supply.

3. The system of claim 2, wherein the power supply control system further includes a capacitor or a rechargeable battery configured to provide power to the load while the power supply control system switches to provision of power from the back-up power supply, or configured to provide power to the load while the back-up power supply controller transitions one of the primary battery banks previously maintained in the long-term storage state to the operable state.

4. The system of claim 1, wherein the condition of each primary battery bank in the plurality of primary battery banks is determined based on measurements of at least one of voltage, resistance, temperature, or output current of the respective primary battery bank.

5. The system of claim 1, wherein the back-up power supply controller is further configured to:

determine if the condition of the first working battery is below an intermediate threshold, wherein the intermediate threshold is higher than the transition preparation threshold, and responsive to determining that the condition of the first working battery is below the intermediate threshold, transition one of the primary battery banks previously maintained in the long-term state to an intermediate state.

6. The system of claim 5, wherein the intermediate threshold includes one of a performance threshold, a shelf-life threshold or an operating time threshold.

7. The system of claim 1, wherein the transition preparation threshold includes one of a performance threshold or a capacity threshold.

8. The system of claim 7, wherein the performance threshold includes an output voltage threshold.

9. The system of claim 7, wherein the capacity threshold includes a shelf-life threshold or an operating time threshold.

10. The system of claim 1, wherein the temperature control system includes a thermal coupling to a load to which the back-up power supply provides power to.

11. The system of claim 1, wherein transitioning one of the primary battery banks previously maintained in the long-term storage state to the operable state includes introducing an electrolyte into one or more batteries of the transitioned primary battery bank.

12. The system of claim 1, wherein the at least one of the plurality of primary battery banks maintained in the long-term storage state are refrigerated to between −5 and 10 degrees Celsius.

13. The system of claim 2, wherein the load comprises a plurality of interconnected computing devices.

14. The system of claim 1, wherein transitioning one of the primary battery banks previously maintained in the long-term storage state to the operable state includes warming the primary battery bank.

15. The system of claim 1, wherein the switching the source of power provided by the back-up power supply is further based on a determination that the condition of the first working battery is below a retirement threshold.

16. The system of claim 15, wherein the retirement threshold includes one of a performance threshold or a capacity threshold.

17. A method for monitoring and controlling a back-up power supply, the method comprising:
monitoring, by a back-up power supply controller, a condition of a first working battery,
determining, by the back-up power supply controller, if the condition of the first working battery is below a transition preparation threshold,
responsive to the determination that the first working battery is below the transition preparation threshold, transitioning, by the back-up power supply controller utilizing a temperature control system, at least one primary battery bank of a plurality of primary battery banks previously maintained in a long-term storage state to an operable state, wherein the long-term storage state comprises a refrigerated state and the operative state comprises a state with a temperature higher than the refrigerated state, designating the transitioned primary battery bank as a second working battery, and switching source of power provided by the back-up power supply from the first working battery to the second working battery.

18. The method of claim 17, further comprising:
monitoring, by a power supply control system, an external power supply providing power to a load,
detecting, by the power supply control system, a power disruption in the power provided by the external power supply, and
responsive to detecting the power disruption, controlling, by the power supply control system, a first switch to change provision of power from the external power supply to the back-up power supply.

19. The method of claim 18, further comprising:
providing power to the load by way of a capacitor or rechargeable battery while the power supply control system switches to provision of power from the back-up power supply or while the back-up power supply controller transitions the at least one primary battery bank previously maintained in the long-term storage state to the operable state.

20. The method of claim 17, further comprising:
monitoring a condition of each primary battery bank of the plurality of primary battery banks by measuring at least one of voltage, resistance, temperature, or output current of the respective primary battery bank.

21. The method of claim 17, further comprising:
determining if the condition of the first working battery is below an intermediate threshold, wherein the intermediate threshold is higher than the transition preparation threshold, and
responsive to a determination that the condition of the first working battery is below the intermediate threshold, transitioning the at least one primary battery bank previously maintained in the long-term state to an intermediate state.

22. The method of claim 21, wherein the intermediate threshold includes one of a performance threshold, a shelf-life threshold or an operating time threshold.

23. The method of claim 17, wherein the transition preparation threshold includes one of a performance threshold or a capacity threshold.

24. The method of claim 23, further comprising:
determining if the condition of the first working battery is below a performance threshold, wherein the performance threshold includes an output voltage threshold.

25. The method of claim 23, further comprising:
determining if the condition of the first working battery is below a capacity threshold, wherein the capacity threshold includes a shelf-life or an operating time threshold.

26. The method of claim 17, wherein transitioning the at least one primary battery banks previously maintained in the long-term storage state to the operable state utilizing the temperature control system comprises directing heat from the temperature control system to a load to which the back-up power supply provides power to.

27. The method of claim 17, wherein transitioning the at least one primary battery bank previously maintained in the long-term storage state to the operable state comprises introducing an electrolyte into one or more batteries of the transitioned primary battery bank.

28. The method of claim 17, further comprising:
refrigerating the at least one primary battery bank previously maintained in the long-term storage to a temperature between −5 and 10 degrees Celsius.

29. The method of claim 18, wherein the load comprises a plurality of interconnected computing devices.

30. The method of claim 17, wherein:
transitioning the at least one primary battery banks previously maintained in the long-term storage state to the operable state comprises warming the at least one primary battery bank.

31. The method of claim 18, further comprising:
determining by the back-up power supply controller, if the condition of the first working battery is below a retirement threshold.

32. The method of claim 31, wherein the retirement threshold includes one of a performance threshold or a capacity threshold.

* * * * *